United States Patent [19]

Kosugi et al.

[11] Patent Number: 4,906,449

[45] Date of Patent: Mar. 6, 1990

[54] METHOD FOR HYDRATING HEMIHYDRATE GYPSUM

[75] Inventors: Tatsuhiro Kosugi, Kitakyushu; Masahiko Suemitu; Masami Goto, both of Nakatsu, all of Japan

[73] Assignee: Toto Ltd., Kitakyushu, Japan

[21] Appl. No.: 257,277

[22] Filed: Oct. 13, 1988

[30] Foreign Application Priority Data

Oct. 13, 1987 [JP] Japan .................................. 62-258117

[51] Int. Cl.$^4$ .......................... C01F 11/46; B29C 35/16
[52] U.S. Cl. .................................... 423/555; 106/109; 156/39; 264/28
[58] Field of Search .......................... 423/555; 264/28; 106/109; 156/39

[56] References Cited

U.S. PATENT DOCUMENTS 3,179,528  4/1965  Holmgren et al. .................. 106/109
4,443,261  4/1984  Nordqvist ............................ 106/109
4,540,439  9/1985  Kurandt .............................. 423/555

OTHER PUBLICATIONS

Tonindustrie Zeitung, 94(1970), Nr. 9, pp. 357–361, "Studium des Einflusses des Wasswedampfdrucks aut die . . . ".

Primary Examiner—Jeffrey E. Russel
Assistant Examiner—Stephen G. Kalinchak
Attorney, Agent, or Firm—Oblon, Spivak, McClelland, Maier & Neustadt

[57] ABSTRACT

A gypsum mold having good water absorbing properties, which is suitable for cast molding pottery, can be prepared by stirring a mixture of hemihydrate gypsum cooled to −40° to 5° C. and water to form a slurry of gypsum in water having a temperature of −5° to 10° C., pouring it into a water-impermeable mold, maintaining it therein until the setting reaction thereof is completed and then releasing the set product from the mold.

4 Claims, No Drawings

METHOD FOR HYDRATING HEMIHYDRATE GYPSUM

BACKGROUND OF THE INVENTION

The present invention relates to a method for hydrating a material based on hemihydrate gypsum to obtain a mold mainly composed of gypsum dihydrate, suitable for castmolding pottery More specifically, the present invention pertains to a method for preparing a mold of gypsum, utilizing a technique for hydrating hemihydrate gypsum, which comprises stirring a mixture of hemihydrate gypsum cooled to $-40°$ to $5°$ C. and water to form a slurry of gypsum in water having a temperature of $-5°$ to $10°$ C., pouring it into a water-impermeable mold, maintaining it therein until the setting reaction thereof is completed and then releasing the product from the mold.

As a mold material for casting pottery, it is common to use gypsum because of its good water absorption properties. A method for manufacturing a mold of gypsum (hereunder referred to as "gypsum mold") in general comprises the steps of mixing powdery hemihydrate gypsum with water to form a slurry of gypsum in water, pouring the slurry into a waterimpermeable mold, maintaining it therein until the setting reaction thereof is finished and then releasing the set product from the mold. In such methods, hemihydrate gypsum is converted to gypsum dihydrate in accordance with the hydration reaction represented by the following reaction formula:

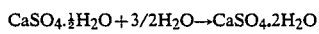

$$CaSO_4 \cdot \tfrac{1}{2}H_2O + 3/2H_2O \rightarrow CaSO_4 \cdot 2H_2O$$

In this reaction, hemihydrate gypsum is first dissolved in water and is thereafter recrystallized as gypsum dihydrate. The crystal of gypsum dihydrate grows in the form of needles and, therefore, capillaries are formed, in the resultant gypsum mold, from voids formed between crystals of gypsum dihydrate. Such high water absorption properties of the gypsum mold are attributable to its high capacity of capillary action.

Making use of these water absorption properties of the gypsum, pottery can effectively be cast-molded from a mold made of gypsum. Water in slurry for casting pottery is taken up by such a gypsum mold when the slurry is poured into the gypsum mold and then is held therein for a prescribed period of time. The water component of the slurry is first reduced due to absorption by the gypsum mold and the slurry is then solidified to form cake and to thereby form a product having the desired shape. In this regard, the time required for the gypsum mold to absorb water from the slurry, in other words the time required for casting a cake, accounts for a major part of the overall time required to form pottery. Thus, to improve the productivity of pottery, it is of great importance to reduce this time.

The casting rate of the cake can be expressed as the casting rate constant K defined as follows:

$$K = L^2/t$$

In this formula, K represents the casting rate constant (cm²/sec), t is the casting time (second) and L represents the thickness of the cake (cm).

K is a constant which is determined from the water absorbing capacity of the gypsum mold and the properties of the slurry for casting pottery and is always a constant irrespective of the casting time t. Therefore, for comparing the water absorbing capacity between different gypsum molds, it is necessary to determine the values K thereof obtained by pouring, into the gypsum molds, slurry for casting pottery having the same properties and to then compare them with each other. As the value K of the mold increases, the casting time of the gypsum mold becomes shorter and thus a gypsum mold with a high value K makes it possible to manufacture pottery with high efficiency.

The casting rate constant K of the gypsum mold is determined by the strength of the capillary action thereof. Thus, the higher the capillary action, in other words, the finer the crystals of the gypsum dihydrate constituting the gypsum mold and the smaller the diameter of the capillaries formed from the voids between the crystals of gypsum dihydrate, the larger the value K. In this connection, this is true only on the premise that the resistance to water penetration of the cake is greater than that of the gypsum mold. Therefore, if a special slurry which forms a cake having a very low resistance to water penetration is used, the diameter of the capillaries cannot be reduced so much. Otherwise, it is sometimes observed that the resistance to water penetration of the cake becomes so large that it can no more be disregarded as compared to that of the gypsum mold and this leads to reduction of the value K.

It is considered that the size of the gypsum dihydrate crystals varies dependent upon the water content of the gypsum slurry from which the gypsum dihydrate is formed, the speed at which the gypsum slurry is stirred and stirring time as well as on the impurity level or another factors. Besides, the temperature of the gypsum slurry is also an important factor which cannot be disregarded. The lower the temperature of the gypsum slurry, the finer the gypsum dihydrate crystals formed and hence the greater the value K. On the contrary, as the temperature of the gypsum slurry becomes lower, the setting requires a longer time and hence the workability is likely to be impaired. For this reason, the temperature of the gypsum slurry (i.e., the temperature thereof after the completion of stirring of the mixture of hemihydrate gypsum and water) generally adopted ranges from $10°$ to $20°$ C. and in particular is preferably around $15°$ C. Taking into consideration, for instance, the increase in temperature of the slurry due to heat of hydration during stirring, it is not possible to obtain a gypsum slurry of around $15°$ C. by simply mixing water of ordinary temperature and gypsum. Thus, the water is cooled prior to mixing it with hemihydrate gypsum to form a gypsum slurry of a desired temperature. This is because cooling of the water is more effective than cooling of the gypsum since the latter is a powder with a small specific heat that is only on the order of 1/5 that of water.

SUMMARY OF THE INVENTION

It is an object of the present invention to provide a novel method for hydrating hemihydrate gypsum, which makes it possible to produce gypsum molds having a value K substantially greater than that of gypsum molds produced by conventional methods without greatly extending the time for coagulation.

The aforementioned and other objects of the present invention can effectively be achieved by providing a method for hydrating hemihydrate gypsum which comprises the steps of stirring a mixture of hemihydrate gypsum cooled to $-40°$ to $5°$ C. and water to form a slurry of gypsum in water having a temperature of $-5°$ to 10° C., pouring it into a water-impermeable mold, maintaining it therein until the setting reaction is completed and then releasing the product from the mold.

In conventional methods, the temperature of gypsum slurry is maintained at 10° to 20° C. and in order to obtain a slurry having such a temperature, cooled water is used. Contrary to this, the inventors of the present invention have found that to increase the value K of the resultant gypsum mold and to reduce the setting time, it is more effective to cool the gypsum used as a starting material than to water as in the conventional methods, although a gypsum slurry having the same temperature ($-5°$ to 10° C.) can be produced by either of these methods. Moreover, the inventors have conducted various studies, on the basis of this finding, to learn how other factors such as the addition of a freezing point depressant and the temperature of the atmosphere during setting exert influence the physical properties of gypsum. Thus, the present invention has been completed.

DESCRIPTION OF THE INVENTION INCLUDING THE PREFERRED EMBODIMENTS

The method of the present invention is carried out by stirring a mixture of hemihydrate gypsum cooled to $-40°$ to 5° C. and water to form a slurry of gypsum in water having a temperature of $-5°$ to 10° C., pouring it into a water-impermeable mold, maintaining it therein until the setting reaction of gypsum is completed and then releasing the product from the mold.

In the method of this invention, if hemihydrate gypsum cooled to a temperature of not more than 0° C. is used, it sometimes becomes difficult to stir the mixture, depending on the conditions and manner of handling, e.g. on the temperature of the hemihydrate gypsum and water; the method used for charging the hemihydrate gypsum into the water; the point at which the stirring is initiated; and the strength of the stirring. This is because water surrounding the cooled hemihydrate gypsum is frozen to form fine ice particles. Therefore, it is preferable to add a freezing point depressant to the water prior to mixing it with the hemihydrate gypsum in order to prevent the occurrence of freezing. The term "freezing point depressant" herein means substances capable of reducing the freezing point of water upon mixing with water. Preferred examples are alcohols such as methanol, ethanol, 1-propanol and isopropanol; glycols such as ethylene glycol, propylene glycol and trimethylene glycol; and glycol ethers such as diethylene glycol, triethylene glycol, dipropylene glycol and tripropylene glycol. The amount of the freezing point depressant to be added to the water should be determined based on the kind of freezing point depressant selected, the temperature of the hemihydrate gypsum and the water, the method used for charging the hemihydrate gypsum into water, the point at which the stirring is initiated and the strength of the stirring. However, it is preferably added to the water in an amount of not more than 20% by weight in order to prevent the freezing point depressant from affecting the strength and other physical properties of the resultant coagulants.

As the means for cooling the hemihydrate gypsum, there may be mentioned, for instance, the method of cooling it in any of various types of freezers. In this respect, the preparation of a gypsum slurry is industrially often carried out in a batchwise operation and there is in general sufficient time between two successive batchwise preparation operations. Economically preferable examples of the means for cooling the gypsum in such cases are thus those methods involving direct spraying of a liquefied gas such as liquefied carbon dioxide or liquefied nitrogen onto the hemihydrate gypsum powder.

One characteristic feature of the present invention is that the value K is increased by lowering the temperature of the gypsum slurry. However, the temperature change which may possibly occur after stirring the mixture to form a slurry and pouring the slurry into a water-impermeable mold also influences the value K. Thus, the value K can further be increased by maintaining, after pouring the slurry, the temperature of the atmosphere surrounding the slurry till it is completely set. As control of the atmospheric temperature is very costly, however, it must be determined whether the economic advantage from the increase in the value K is sufficient to offset the added cost of atmospheric temperature control.

The method of the present invention will hereunder be explained in more detail.

Utilizing 100 parts by weight of hemihydrate gypsum and 70 parts by weight of water, which were maintained at different temperatures in the respective tests, hemihydrate and water were mixed with one another to adjust the temperature of the slurry obtained after the completion of the stirring to $10\pm1°$ C., $5\pm1°$ C., $0\pm1°$ C. or $-5\pm1°$ C. The setting times and the values of K observed when the same slurry for casting was used are summarized in Table I below. In test Nos. 9, 11, 12, 13 and 14, a part of the water was replaced with a corresponding amount of ethylene glycol. For example, the slurry of test No. 9 comprised 100 parts by weight of hemihydrate gypsum, 63 parts by weight of water and 7 parts by weight of ethylene glycol. The atmospheric temperature during setting was normal temperature.

TABLE I

| Test No. | 1 | 2 | 3 | 4 | 5 |
|---|---|---|---|---|---|
| Temp. (°C.) of gypsum slurry | 10.5 | 10.0 | 10.3 | 9.7 | 5.9 |
| Temp. (°C.) of hemihydrate gypsum | 26 | $-1$ | $-10$ | $-20$ | 18 |
| Temp. (°C.) of water | 4.3 | 11.5 | 14.1 | 17.5 | 1.8 |
| Amount of ethylene glycol (pbw)* | | | | | |
| Setting time (min.) | 47 | 46 | 46 | 45 | 54 |
| Value K (cm²/sec) | $2.28 \times 10^{-4}$ | $2.30 \times 10^{-4}$ | $2.33 \times 10^{-4}$ | $2.35 \times 10^{-4}$ | $2.41 \times 10^{-4}$ |

| Test No. | 6 | 7 | 8 | 9 | 10 |
|---|---|---|---|---|---|
| Temp. (°C.) of gypsum slurry | 5.6 | 4.8 | 5.3 | 0.6 | $-0.1$ |
| Temp. (°C.) of hemihydrate gypsum | 5 | $-10$ | $-29$ | 2 | $-21$ |
| Temp. (°C.) of water | 4.8 | 9.3 | 14.0 | $-3.3$ | 3.5 |
| Amount of ethylene glycol (pbw)* | | | | 7 | |
| Setting time (min.) | 52 | 51 | 50 | 64 | 56 |
| Value K (cm²/sec) | 2.58 | 2.63 | 2.72 | 2.70 | 2.80 |

| Test No. | 11 | 12 | 13 | 14 |
|---|---|---|---|---|
| Temp. (°C.) of gypsum slurry | 0.7 | $-4.2$ | $-4.5$ | $-4.6$ |
| Temp. (°C.) of hemihydrate gypsum | $-38$ | $-18$ | $-30$ | $-38$ |
| Temp. (°C.) of water | 8.3 | $-3.2$ | 0.5 | 3.2 |
| Amount of ethylene glycol (pbw)* | 2 | 7 | 6 | 6 |
| Setting time (min.) | 53 | 68 | 65 | 64 |
| Value K (cm²/sec) | $2.88 \times$ | $2.86 \times$ | $2.89 \times$ | $2.93 \times$ |

TABLE I-continued

|  | $10^{-4}$ | $10^{-4}$ | $10^{-4}$ | $10^{-4}$ |
|---|---|---|---|---|

*"pbw" means "parts by weight".

As will be noted from the results shown in Table I, as the temperature of the gypsum slurry decreases, the value K increases while the setting time becomes longer. However, even between examples in which the temperature of the slurry is the same, the value K is larger and the setting time is shorter in the case where the hemihydrate gypsum is cooled than in the case where the water is cooled.

In order to examine the effect of the atmospheric temperature during setting of the slurry, 100 parts by weight of hemihydrate gypsum having a temperature of −25° C. and 70 parts by weight of water having a temperature of 13.0° C. were mixed and stirred to form a gypsum slurry of 6.1° C., then the slurry was poured into a water-impermeable mold and the slurry was set at an atmospheric temperature of 20°, 10°, −10° or −20° C. to determine the setting time and the value K observed when the same slurry for casting was used. The results obtained are summarized in Table II below.

TABLE II

| Test No. | 1 | 2 | 3 | 4 | 5 |
|---|---|---|---|---|---|
| Temp. (°C.) of atmosphere | −20 | −10 | 0 | 10 | 20 |
| Setting time (min.) | 58 | 54 | 51 | 50 | 48 |
| Value K (cm²/sec) | $3.13 \times 10^{-4}$ | $3.07 \times 10^{-4}$ | $3.01 \times 10^{-4}$ | $2.90 \times 10^{-4}$ | $2.75 \times 10^{-4}$ |

As seen from the results shown in Table II, the value K can further be increased by lowering the atmospheric temperature during the setting of the gypsum slurry.

In the method of the present invention, the temperature of the hemihydrate gypsum used is critical and ranges from −40° to 5° C. This is because if it is lower than −40° C., the freezing of the water which surrounds the hemihydrate gypsum cannot be prevented simply by adding a freezing point depressant, while if it exceeds 5° C., the desired improvement of the value K cannot be expected. Moreover, the temperature of the gypsum slurry in the present invention is likewise limited to a range of from −5° to 10° C. This is because if it is less than −5° C., it takes a long period of time to completely set the gypsum slurry and thus the workability thereof is extremely impaired. On the other hand, if it exceeds 10° C., almost no improvement of the value K can be expected.

The method of the present invention will now be explained in more detail with reference to the following nonlimitative working Examples.

In the following Examples and Comparative Examples, the setting time, the bending strength in dry state and the value K were determined as follows:

Setting Time

The change in temperature of the gypsum slurry after pouring it into the water-impermeable mold was monitored with a thermocouple. The setting time is defined as the time elapsed until the temperature of the slurry reaches its maximum value after the completion of stirring.

Bending Strength in Dry State

After a test piece measuring 15×15×150 mm was dried, it was subjected to a three point bending test at a span of 100 mm and a head speed of 2.5 mm/min. The values thus obtained are considered to be the bending strength in dry state.

Value K

A test piece measuring 75 mm in diameter and 30 mm in thickness was dried and thereafter allowed to stand in a thermostat at 30° C. for 24 hours. A transparent cylinder was put over the test piece and a slurry for casting, which was composed mainly of clay, feldspar and pottery stone and which had a specific gravity of 1.7 and a temperature of 30° C., was poured into the cylinder The thickness of the resulting cake was monitored through the transparent cylinder and the value K was calculated from the relation: $K = L^2/t$. (The measurement of the thickness is preferably carried out in the thermostat at 30° C.)

EXAMPLE 1

There was obtained a gypsum slurry of 2.5° C. by stirring, at a speed of 500 rpm for 3.5 minutes, a mixture of 20 kg of hemihydrate gypsum (available from NITTO GYPSUM CO., LTD. as beta-gypsum) which had been cooled to −20° C. by spraying with liquefied carbon dioxide and 14.5 kg of water maintained at 6.0° C. The gypsum slurry thus prepared was poured into a water-impermeable mold and was allowed to stand at room temperature. After 48 minutes, the setting of the slurry was finished Then, the molded product was released from the mold, dried at 50° C. for 48 hours and then subjected to the measurement of the bending strength in dry state and the value K, which were found to be 54.4 kg/cm² and $2.87 \times 10^{-4}$ cm²/sec respectively.

EXAMPLE 2

There was obtained a gypsum slurry of −1.5° C. by stirring, under the same conditions as in Example 1, 20 kg of hemihydrate gypsum (available from NITTO GYPSUM CO., LTD. as beta-gypsum) which had been cooled to −30° C. by spraying with liquefied carbon dioxide and a mixture of 14.2 kg of water and 0.3 kg of ethylene glycol maintained at 6.0° C. The gypsum slurry thus prepared was poured into a water-impermeable mold and was allowed to stand in a freezer maintained at −5° C. After 52 minutes, the setting of the slurry was finished. Then, the bending strength in dry state and the value K were measured under the same conditions as in Example 1 and were found to be 56.3 kg/cm² and $3.05 \times 10^{-4}$ cm²/sec respectively.

COMPARATIVE EXAMPLE

There was obtained a gypsum slurry of 15.3° C. by stirring 20 kg of hemihydrate gypsum (available from NITTO GYPSUM CO., LTD. as beta-gypsum) maintained at 20° C. and 14.5 kg of water maintained at 13.5° C. under the same conditions as in Example 1. The slurry thus prepared was poured into a water-impermeable mold and was allowed to stand at room temperature to cause setting which was completed after 44 minutes. Then, the bending strength in dry state and the value K were measured in the same manner as in Example 1 and were found to be 51.8 kg/cm² and $2.29 \times 10^{-4}$ cm²/sec respectively.

In accordance with the method of the present invention (see Examples 1 and 2), the value K can be increased without much extension of the setting time beyond that in the conventional method (Comparative Example).

As discussed above in detail, if hemihydrate gypsum is hydrated in accordance with the method of the present invention, gypsum molds having a value K substantially greater than that of a mold produced by the conventional method (in other words, gypsum molds exhibiting high casting rate) can be manufactured with minimal extension of the setting time.

What is claimed is:

1. A method for hydrating hemihydrate gypsum which comprises the steps of stirring a mixture of hemihydrate gypsum cooled to −40° to 5° C. and water to form a slurry of gypsum in water having a temperature of −5° to 10° C., pouring it into a water-impermeable mold, maintaining it therein until a setting reaction thereof is completed and then releasing a set product from the mold.

2. A method as set forth in claim 1 wherein the gypsum slurry further comprises a freezing point depressant.

3. A method as set forth in claim 1 wherein the hemihydrate gypsum is cooled with a liquefied gas.

4. A method as set forth in claim 1 wherein after the gypsum slurry is poured into the water-impermeable mold, it is held within an atmosphere maintained at a temperature ranging from −20° to 10° C. until the setting reaction thereof is completed.

* * * * *